United States Patent [19]
Miwa et al.

[11] Patent Number: 5,473,149
[45] Date of Patent: Dec. 5, 1995

[54] BAR CODE READING APPARATUS WITH MULTIFOCAL LENGTH OPTICAL SYSTEM

[75] Inventors: Takeshi Miwa; Takeshi Matsushima, both of Kariya, Japan

[73] Assignee: Nippondenso Co., Ltd., Kariya, Japan

[21] Appl. No.: 248,499

[22] Filed: May 24, 1994

[30] Foreign Application Priority Data

May 25, 1993 [JP] Japan .................... 5-122570

[51] Int. Cl.⁶ .................................................. G66K 7/10
[52] U.S. Cl. ................................... 235/472; 235/462
[58] Field of Search .................... 235/472, 462

[56] References Cited

U.S. PATENT DOCUMENTS

| | | | |
|---|---|---|---|
| 4,818,886 | 4/1989 | Drucker | 235/472 |
| 4,900,907 | 2/1990 | Matusima | 235/472 |
| 5,091,636 | 2/1992 | Takada et al. | 235/472 |
| 5,210,398 | 5/1993 | Metlitsky | 235/472 |
| 5,308,966 | 5/1994 | Danielson | 235/472 |

FOREIGN PATENT DOCUMENTS

| | | |
|---|---|---|
| 2-174362 | 7/1990 | Japan . |
| 3-230286 | 10/1991 | Japan . |

*Primary Examiner*—Harold Pitts
*Attorney, Agent, or Firm*—Cushman Darby & Cushman

[57] ABSTRACT

A bar code reader is provided which comprises a photodetector responsive to light reflected from a bar code to provide a signal indicative of bar code information, a lens assembly including a near range focus lens and a long range focus lens having different focal lengths, and a liquid crystal filter assembly. The liquid crystal assembly includes a near range focus filter and a long range focus filter and selectively allows only light emerging from one of the near range focus lens and the long range focus lens to reach the photodetector according to the distance to the bar code.

15 Claims, 6 Drawing Sheets

BAR CODE READING APPARATUS WITH MULTIFOCAL LENGTH OPTICAL SYSTEM

BACKGROUND OF THE INVENTION

1. Technical Field of the Invention

The present invention relates generally to an optical information reading apparatus. More particularly, the invention is directed to an improved bar code reading apparatus including a multifocal length optical system for finely focusing bar code images on an image sensor according to the distance between the apparatus and a bar code.

2. Background Art

Conventional optical bar code readers can be classified according to their optical information-reading modes as electronic scanning or laser scanning type devices. The electronic scanning type device reads a bar code in direct contact with a bar code label attached on an article, while the laser scanning type device indirectly reads the bar code at a distance therefrom. These types may be used appropriately according to the distance to the bar code. However, in recent years, there is an increasing need for a bar code reader which optically reads a bar code over a wide focal range between short and long distances to the bar code.

Japanese Patent First Publication No. 2-174362 teaches an improved bar code reader which includes an optical system with a variable diaphragm mechanism for assuring bar code reading in an extended focal range.

Such a prior art bar code reader, however, encounters the drawback in that when a lens opening is decreased for adjusting a focal length, it may cause the quantity of light reflected from the bar code to become lower than a sensitivity level of a photodetector.

SUMMARY OF THE INVENTION

It is therefore a principal object of the present invention to avoid the disadvantages of the prior art.

It is another object of the present invention to provide a bar code reader which is capable of assuring the quantity of light reflected from a bar code sufficient to read bar code images finely over a wide range of distance to the bar code.

According to one aspect of the present invention, there is provided an optical information reading apparatus which comprises a photodetector responsive to light reflected from an object carrying preselected optical information to provide a signal indicative thereof, a lens assembly including a plurality of lens having different focal lengths for focusing the reflected light from the object on the photodetector, a reflected light selecting means for selectively allowing only light emerging from one of the lenses of the lens assembly to reach the photodetector while blocking light from other lenses of the lens assembly, and an optical information reading means for reading the optical information carried on the object based on the signal from the photodetector.

According to another aspect of the present invention, there is provided an optical information reading apparatus which comprises a photodetector responsive to a light beam reflected from an object carrying preselected optical information to provide a signal indicative thereof, a lens assembly including a near range focus lens and a long range focus lens each focusing the light beam reflected from the object on the photodetector, the near range focus lens having a near range focal length, while the long range focus lens has a long range focal length, a reflected light selecting means, switchable between first and second operational modes, for selecting one of the light beams passing through either the near range focus lens or the long range focus lens of the lens assembly, the first operational mode being to allow the light beams emerging from the near range focus lens to reach the photodetector while blocking the light beams projected from the long range focus lens, and the second operational mode allowing the light beams emerging from the long range focus lens to reach the photodetector while blocking the light beams projected from the near range focus lens, and an optical information reading means for reading the optical information carried on the object based on the signal from the photodetector.

In the preferred mode, a manual selector switch is provided which outputs first and second switching signals. The reflected light selecting means establishes the first operational mode in response to the first switching signal and the second operational mode in response to the second switching signal.

Instead of the manual selector switch, a distance determining sensor may be provided which determines distance between the lens assembly and the object to provide a signal indicative thereof. The reflected light selecting means is responsive to the signal from the distance determining sensor to provide the first operational mode when the distance is smaller than a preselected value and to provide the second operational mode when the distance is greater than the preselected value.

The reflected light selecting means is provided with a liquid crystal filter including first and second filter sections. The first filter section provides a transmittance of about zero to block the light beam from the long range focus lens of the lens assembly in the first operational mode, while the second filter section provides a transmittance of about zero to block the light beam from the near range focus lens of the lens assembly in the second operational mode.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for the purpose of explanation and understanding only.

In the Drawings

DESCRIPTION OF THE PREFERRED EMBODIMENTS

Figure 1:
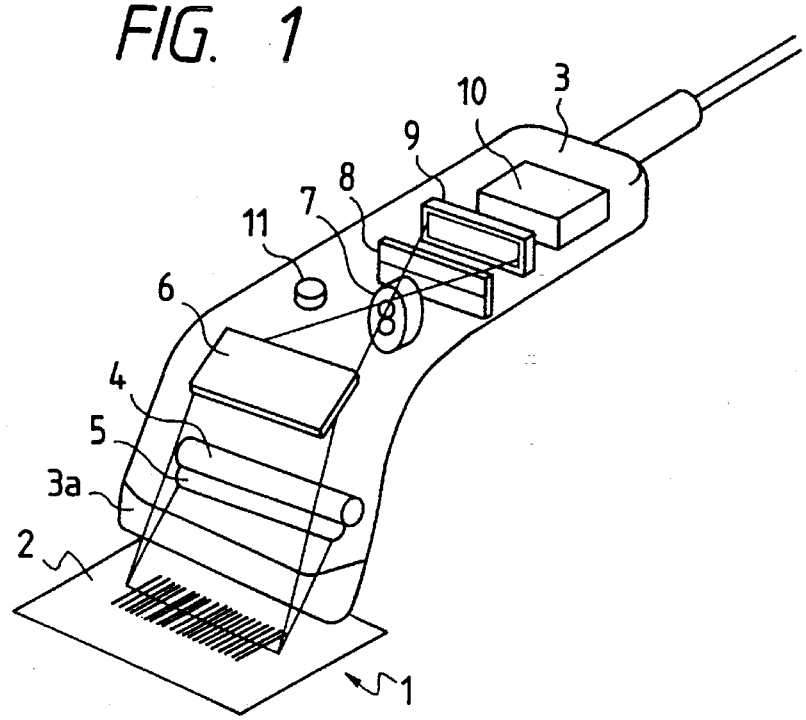
FIG. 1 is a perspective view which shows a bar code reader according to the present invention.

Referring now to the drawings, wherein like numbers refer to like parts in several views, particularly to FIG. 1, there is shown a portable bar code reader 1 according to the present invention.

The bar code reader 1 includes generally a casing 3, an LED module 4, a lighting lens 5, a mirror 6, a lens assembly 7, a liquid crystal filter assembly 8, a CCD image sensor 9, an electronic control unit (ECU) 10, and a manual selector switch 11.

The casing 3 has a light-transmissive window 3a formed in a front portion thereof. The LED module 4 includes a plurality of light-emitting diodes arranged in sequence for emitting a light beam onto a bar code 2 disposed on an article through the lighting lens 5. The mirror 6 directs the light beam reflected from the bar code 2 carrying bar code pattern information to the lens assembly 7. The lens assembly 7 then focuses the light beam on the CCD image sensor 9 through the liquid crystal filter assembly 8. The CCD image sensor 9 is provided with a one-dimensional photoelectric transducer (i.e., photodetector) which is responsive to the light beam focused through the liquid crystal filter assembly 8 to provide an electric signal to the ECU 10. The selector switch 11, as will be described later in detail, is operated by the user to switch operation modes of the liquid crystal filter assembly 8 through the ECU 10 to selectively allow the light beam from the lens assembly 7 to pass therethrough or to block it according to the distance to the bar code 2.

Figure 2:
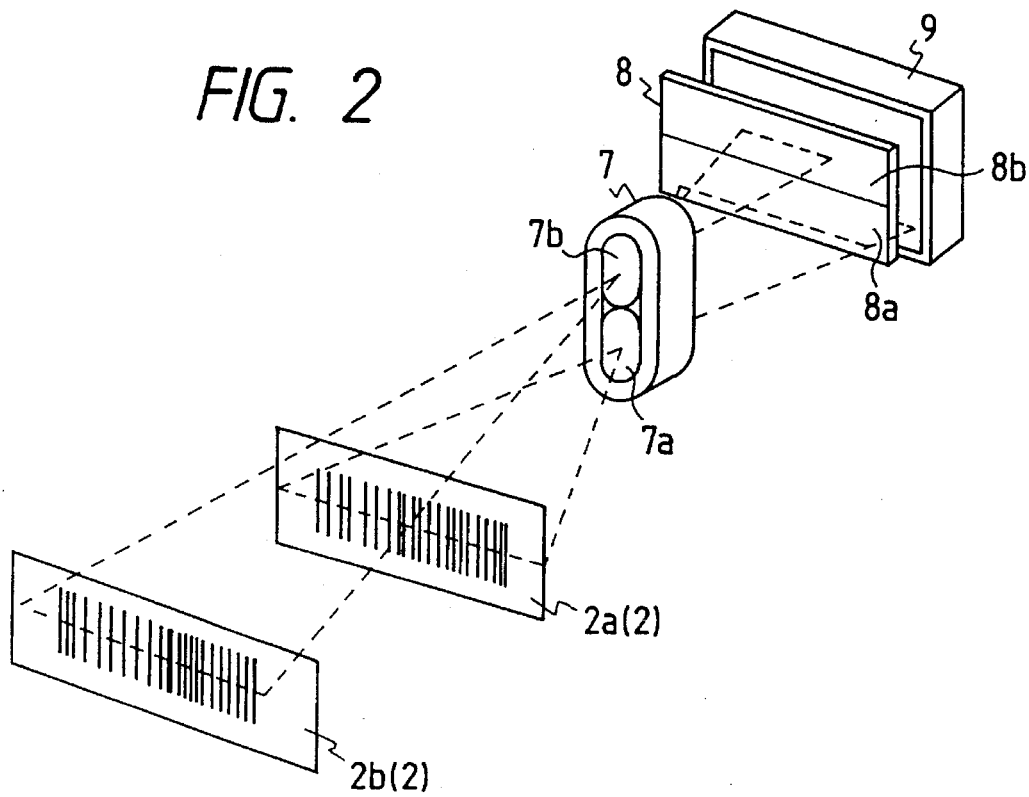
FIG. 2 is a perspective view which shows an arrangement of a lens assembly including a near range focus lens and a long range focus lens.
Figure 3:
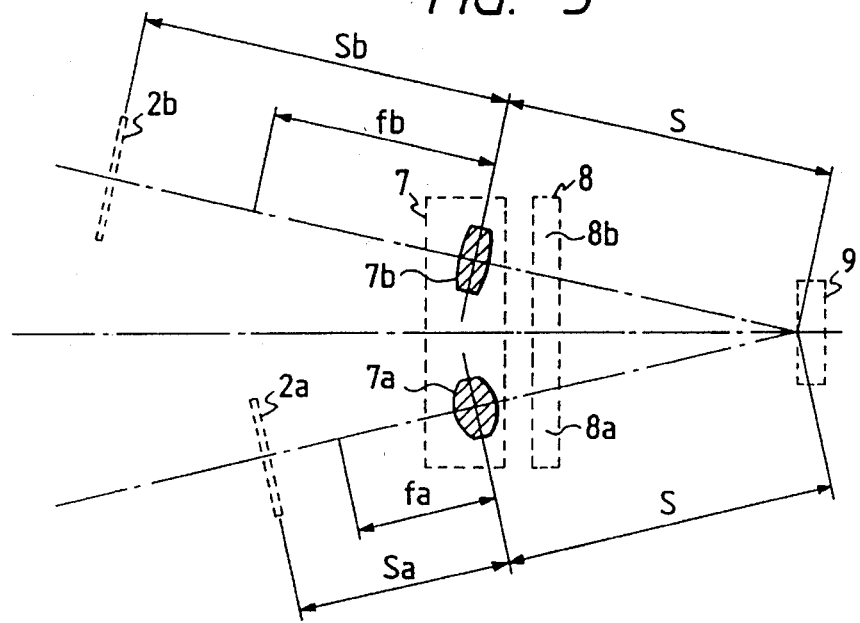
FIG. 3 is an illustration which shows optical paths defined between a bar code disposed near a bar code reader and a near range focus lens and between a bar code present far off the bar code reader and a long range focus lens.

Referring to FIGS. 2 and 3, the lens assembly 7 includes a near range focus lens 7a and a long range focus lens 7b arranged parallel to each other. The near range focus lens 7a is designed to have a short focal length fa to converge light, reflected from a bar code 2a disposed at a short distance Sa away therefrom, on the CCD image sensor 9 arranged at a distance S away from the near range focus lens 7a. The long range focus lens 7b is designed to have a long focal length fb to converge light, reflected from a bar code 2b present at a long distance Sb away therefrom, on the CCD image sensor 9 arranged at the distance S from the long range focus lens 7b The liquid crystal filter assembly 8, as shown in FIG. 3, includes a near range focus filter 8a and a long range focus filter 8b mounted vertically on optical paths of light beams traveling through the near range and long range focus lenses 7a and 7b, respectively.

Figure 4:
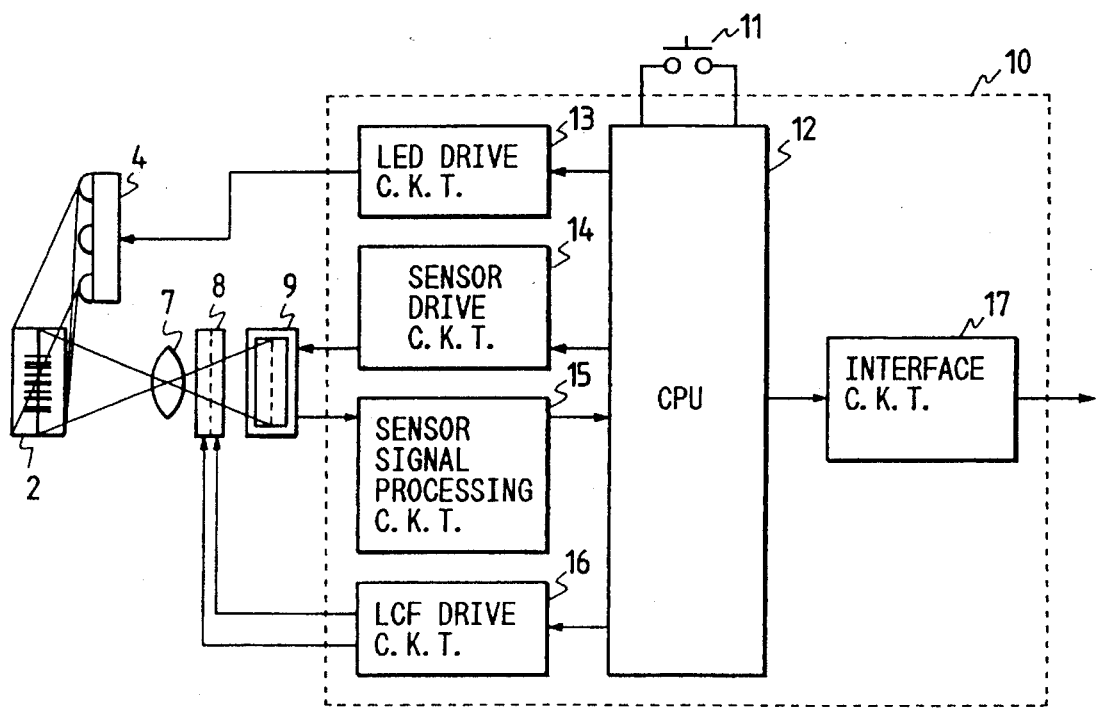
FIG. 4 is a circuit diagram which shows a bar code reader of the invention.

Referring to FIG. 4, there is shown a block diagram of the bar code reader 1. The ECU 10 includes a central processing unit (CPU) 12 provided with a ROM and a RAM storing therein given programs for control of peripheral circuits and analysis of bar code pattern information. The ECU 10 further includes an LED drive circuit 13, a sensor drive circuit 14, a sensor signal processing circuit 15, an LCF drive circuit 16, and an interface circuit 17. The LED drive circuit 13 is responsive to a control signal from the ECU 10 to control the LED module 4. Similarly, the sensor drive circuit 14 is responsive to a control signal from the ECU 10 to control the CCD image sensor 9. The sensor signal processing circuit 15 amplifies and digitizes sensor signals from the CCD image sensor 9 for output to the ECU 10. The LCF drive circuit 16 operates the near range focus filter 8a and the long range focus filter 8b of the liquid crystal filter assembly 8 independently based on a command signal from the ECU 10. The interface circuit 17 provides information signals to external devices (not shown) based on the results of analysis of the outputs from the sensor signal processing circuit 15 in the ECU 10.

Figure 5:
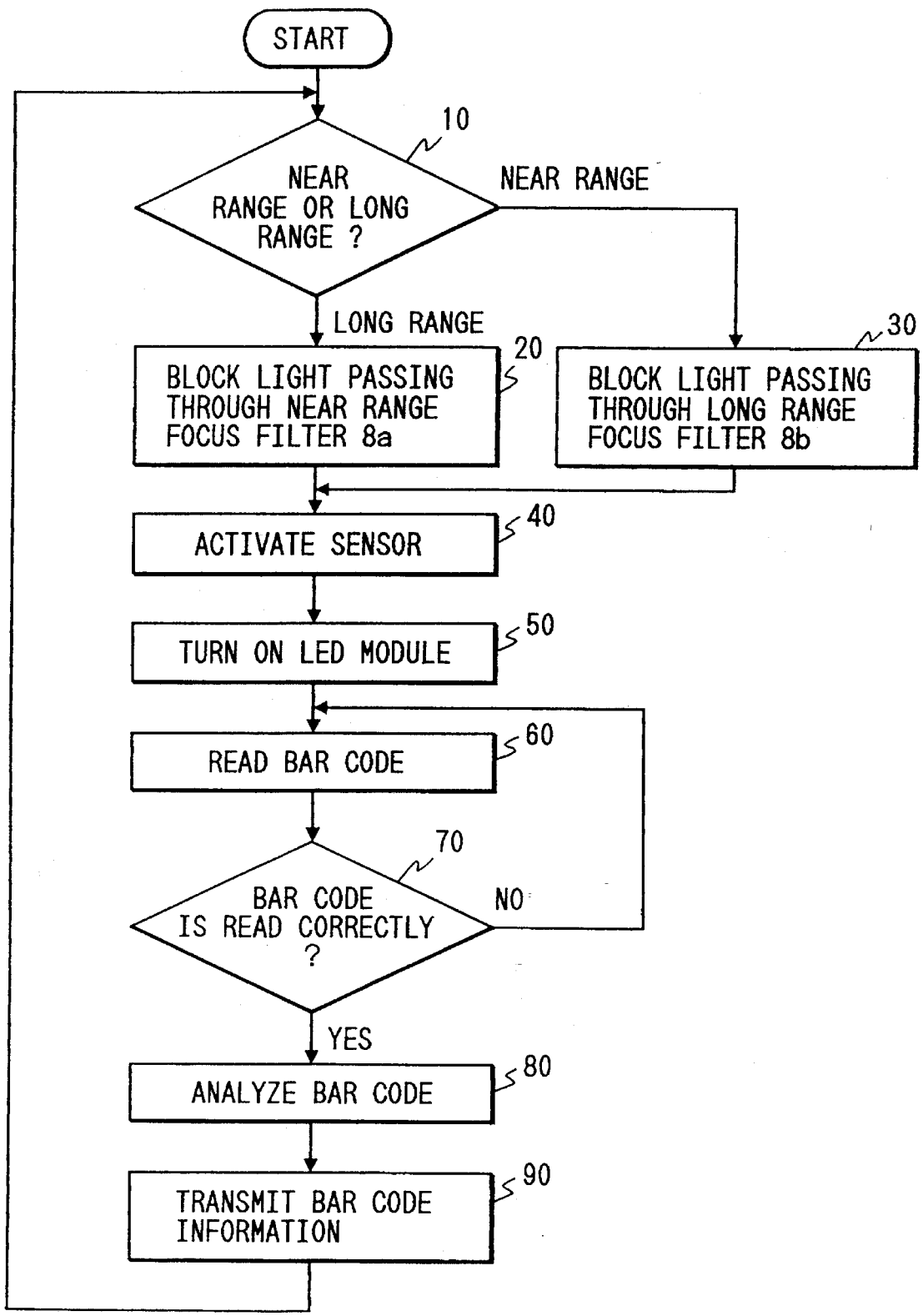
FIG. 5 is a flowchart of a program performed by a control unit of a bar code reader of the invention.

Referring to FIG. 5, there is shown a flowchart of a program or sequence of logical steps performed by the ECU 10. This program is initiated in response to power supply to the ECU 10.

After entering the program, the routine proceeds to step 10 wherein it is determined whether a distance between the bar code reader 1 and the bar code 2 is short or long, that is, whether the selector switch 11 assumes a near range focus position or a long range focus position. If the long range focus position is established, then the routine proceeds to step 20 wherein the LCF drive circuit 16 is controlled to reduce the transmittance of the near range focus filter 8a of the liquid crystal filter assembly 8 to approximately zero to block light passing therethrough. Alternatively, if it is determined in step 10 that the selector switch 11 assumes the near range focus position, the routine then proceeds to step 30 wherein the LCF drive circuit 16 is controlled to reduce the transmittance of the long range focus filter 8b of the liquid crystal filter assembly 8 to approximately zero to block light passing therethrough.

After step 20 or 30, the routine proceeds to step 40 wherein the CCD image sensor 9 is activated by the sensor drive circuit 14. Subsequently, in step 50, the LED module 4 is turned on through the LED drive circuit 13.

In step 60, based on sensor signals from the CCD image sensor 9, bar code pattern information carried on the bar code 2 is read through the sensor signal processing circuit 15.

Afterwards, the routine proceeds to step 70 wherein it is determined whether or not the bar code pattern information was read correctly in step 60. If a YES answer is obtained, then the routine proceeds to step 80. Alternatively, if a NO answer is obtained concluding that the bar code pattern information was not read correctly then the routine returns back to step 60.

In step 80, the bar code pattern information read in step 60 is analyzed based on light reflectivities of bars and spaces of the bar code 2 to provide high and low signal levels. The routine then proceeds to step 90 wherein the bar code pattern information analyzed in step 80 is electrically transmitted to the external devices through the interface circuit 17. After step 90, the routine returns back to step 10.

Figure 6:
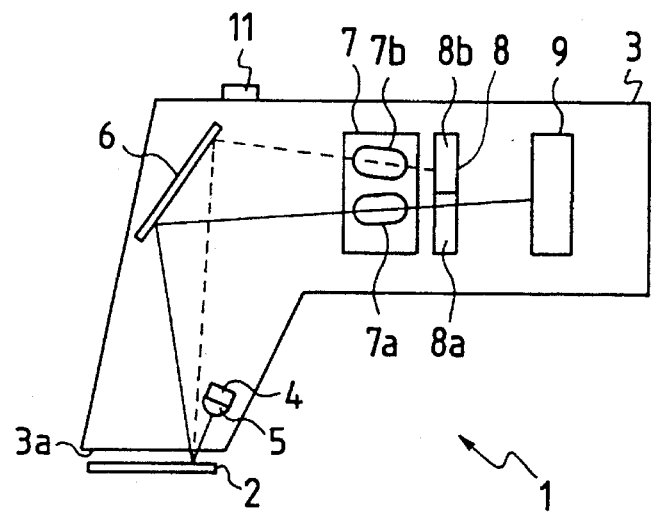
FIG. 6 is an illustration which shows a bar code reader arranged at a shorter distance to a bar code.

An operation of the bar code reader 1 will be explained with reference to FIGS. 6 and 7. FIG. 6 shows the bar code reader 1 located in the vicinity of the bar code 2 wherein the selector switch 11 is in the near range focus position to allow light to pass through only the near range focus filter 8a, while FIG. 7 shows the bar code reader 1 disposed far off the bar code 2 wherein the selector switch 11 is in the long range focus position to allow light to pass through only the long range focus filter 8b.

In FIG. 6, when the LED module 4 emits light toward the bar code 2 through the lighting lens 5, the bar code 2 has the light experience irregular reflection according to the bars and spaces thereof. The light reflected on the bar code 2 then travels to the mirror 6 through the light-transmissive window 3a which is, in turn, directed to the lens assembly 7. The light entering the lens assembly 7 passes through both the near range focus lens 7a and the long range focus lens 7b and then reach the filter assembly 8. Since the transmittance of the long range focus filter 8b is decreased to about zero, only the light passing through the near range focus lens 7a is focused on a photosensitive surface of the CCD image sensor 9 through the near range focus filter 8a.

Figure 7:
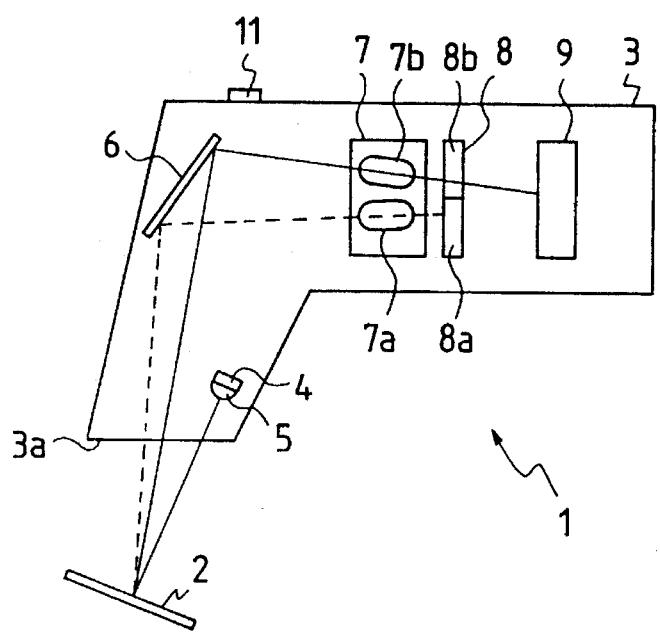
FIG. 7 is an illustration which shows a bar code reader disposed at a longer distance to a bar code.

In FIG. 7, the bar code reader 1, as discussed above, is distant from the bar code 2, and the near range focus filter 8a is controlled to show a transmittance of zero. Therefore, only light passing through the long range focus lens 7b of the lens assembly 7 is focused on the CCD image sensor 9 so that fine images are detected.

With the above arrangements of the bar code reader 1, the bar code pattern information or bar code images can be read finely over a wide range of distance to the bar code 2 by selecting one of the reflected light beams from the bar code 2 which have passed through the near range focus lens 7a and the long range focus lens 7b according to the distance thereto. In addition, since passage of light through the liquid crystal filter 8 is electrically controlled, a compact and noiseless bar code reader having high durability may be provided.

Figure 8:
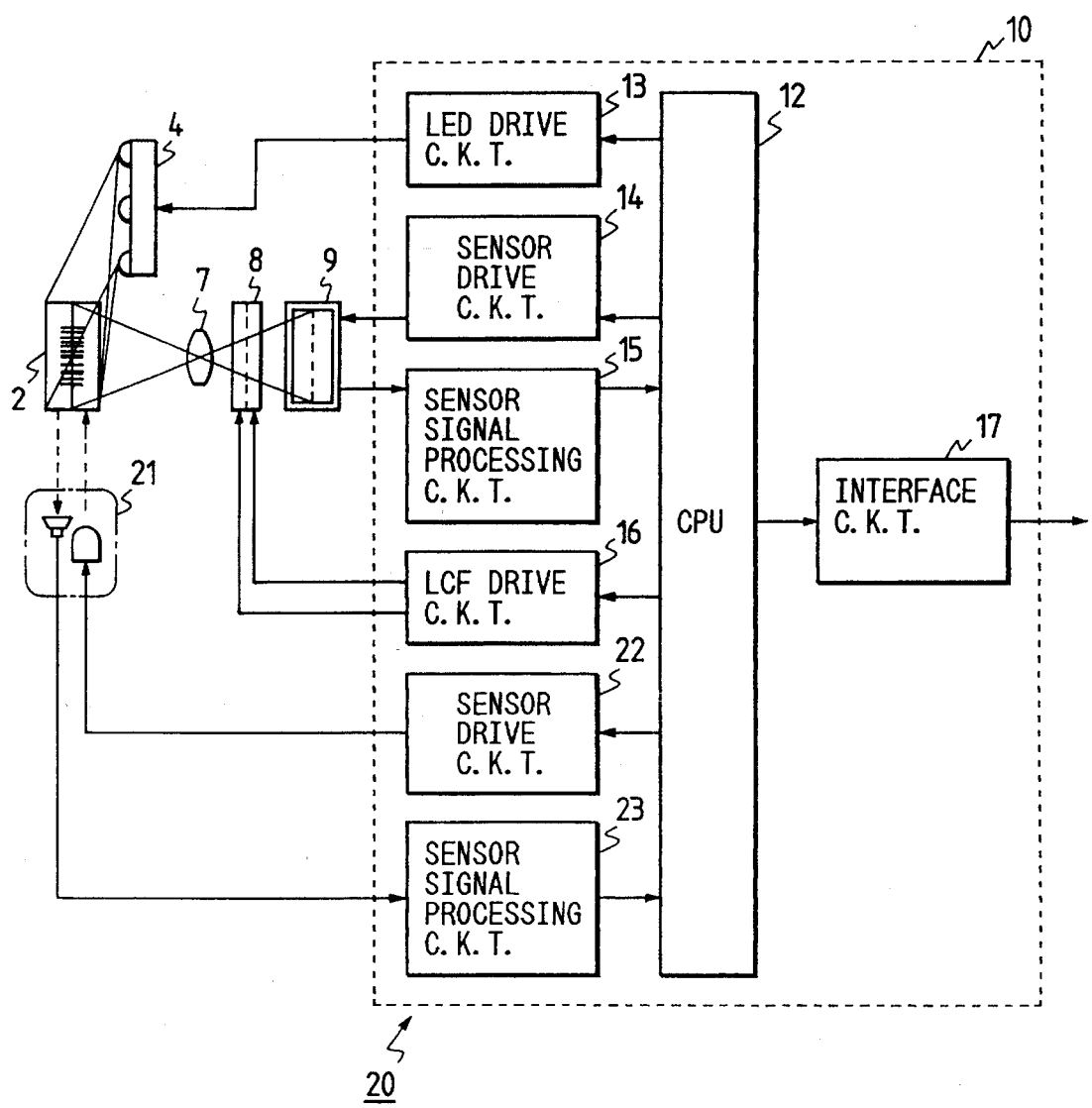
FIG. 8 is a circuit diagram which shows a circuit diagram of a bar code reader according to an alternative embodiment.

Referring to FIG. 8, there is shown a bar code reader 20 with an automatic focus switching function according to an alternative embodiment of the invention. The like reference numbers employed in FIG. 8 refer to like parts in the above first embodiment and explanation thereof in detail will be omitted here.

The bar code reader 20 includes a sonic sensor 21, a sonic sensor drive circuit 22, and a sonic sensor signal processing circuit 23. In operation, when the CPU 12 provides a control signal to the sonic sensor 21 through the sonic sensor drive circuit 22, the sonic sensor 21 outputs sound waves to the bar code 2, receives the reflected sound waves therefrom, and provides a representative signal to the sonic sensor signal processing circuit 23. The sonic sensor signal processing circuit 23 then measures the time the sound wave requires to travel from the sonic sensor 21 to the bar code 2 and back to determine a distance to the bar code 2. When the distance to the bar code 2 determined by the sonic sensor signal processing circuit 23 is less than a preselected value, the CPU 12, similar to the first embodiment, concludes that the bar code 2 is disposed near the bar code reader 20, and provides a control signal to the liquid crystal filter 8 through the LCF drive circuit 22 to reduce the transmittance of the long range focus filter 8b to zero. Alternatively, when the distance to the bar code 2 is greater than the preselected value, the liquid crystal filter 8 is controlled through the LCF drive circuit 22 to decrease the transmittance of the near range focus filter 8a to zero. With these arrangements, the bar code reader 20 can automatically switch the operational modes of the liquid crystal filter assembly 8 based on the distance to the bar code 2 detected by the sonic sensor 21 and thus focus the bar code images finely on the CCD image sensor 9.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

Figure 9:
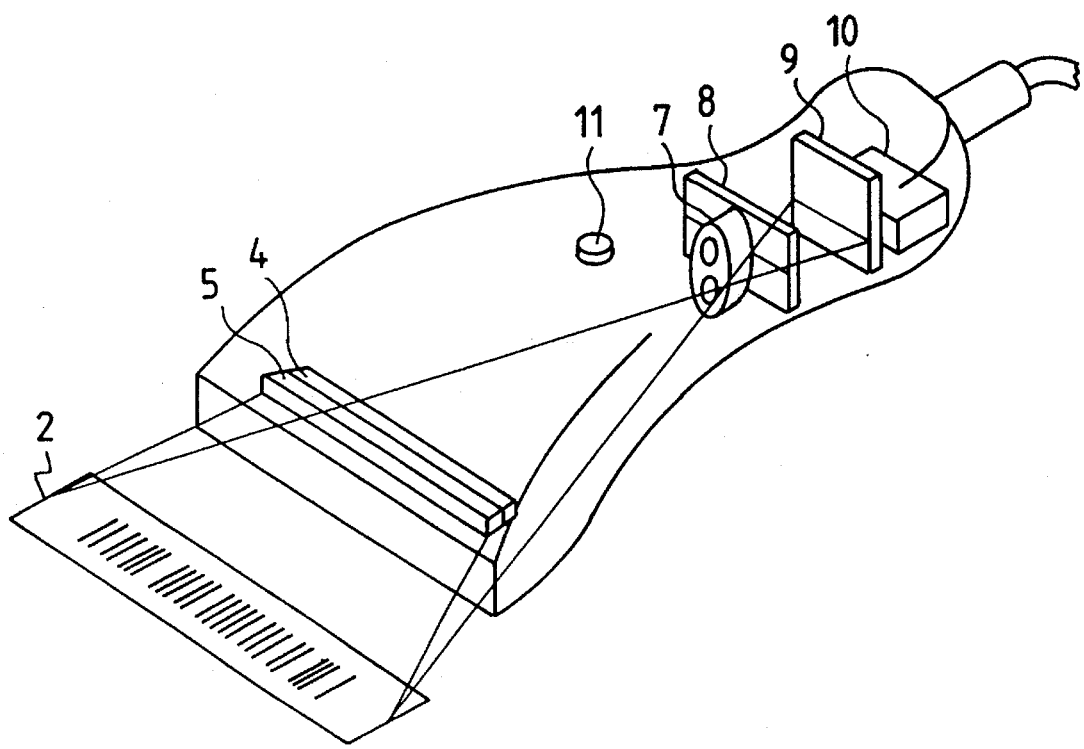
FIG. 9 is a perspective view which shows a modification of an optical system of a bar code reader.

For example, as shown in FIG. 9, the mirror 6, as employed in the first embodiment for directing light from the bar code 2 to the lens assembly 7, may be omitted as long as the bar code reader is so constructed that light reflected from the bar code 2 entering the bar code reader may travel along an optical path defined on a plane extending between the light-transmissive window 3a and the lens assembly 7. Additionally, in the above embodiments, the lens assembly 7 includes the two different range focus lenses 7a and 7b, however it may include more than three different range focus lenses. In this case, the liquid crystal filter 8 preferably includes separate sections of a number corresponding to that of the focus lenses.

As long as the LED module 4 is designed to provide a uniform distribution of illumination intensity, the lighting lens may be omitted. Further, when the CCD image sensor 9 has a sensitivity high enough to read bar code images at ambient brightness levels, the LED module 4 may also be omitted.

What is claimed is:

1. An optical information reading apparatus comprising:

a single photodetector sensor responsive to light reflected from an object including encoded preselected optical information, said single photodetector sensor providing a signal indicative of said optical information;

a lens assembly including a plurality of lenses arranged in parallel and having respective focal lengths which are different, each of said plurality of lenses focusing light reflected from said object on said single photodetector sensor;

reflected light selecting means for selectively allowing only light emerging from one of said plurality of lenses of said lens assembly to reach said single photodetector sensor while blocking light emerging from others of said plurality of lenses of said lens assembly from reaching said single photodetector sensor; and optical information reading means for reading said optical information encoded on said object based on said signal indicative of said optical information.

2. An optical information reading apparatus according to claim 1, further comprising:

a selector switch;

said reflected light selecting means being responsive to a signal from said selector switch to selectively allow only said light emerging from said one of said plurality of lenses of said lens assembly to reach said single photodetector sensor.

3. An optical information reading apparatus according to claim 2, wherein said selector switch is manually operated switch.

4. An optical information reading apparatus according to claim 1, wherein said reflected light selecting means includes a liquid crystal filter having a plurality of sections, each of said plurality of sections of said liquid crystal filter having a variable transmittance.

5. An optical information reading apparatus according to claim 1, further comprising:

distance determining means for determining a distance between said lens assembly and said object, and for providing a signal indicative of said distance;

said reflected light selecting means being responsive to said signal provided by said distance determining means to selectively allow only said light emerging from said one of said plurality of lenses of said lens assembly having a focal length from among said respective different focal lengths corresponding to said distance.

6. An optical information reading apparatus comprising:

a single photodetector sensor responsive to a light beam reflected from an object including encoded preselected optical information, said single photodetector sensor providing a signal indicative of said optical information;

a parallel lens assembly including a near range focus lens and a long range focus lens each focusing said light beam reflected from said object on said single photodetector sensor, said near range focus lens having a near range focal length, and said long range focus lens having a long range focal length longer than said near range focal length;

reflected light selecting means, switchable between a first operational mode and a second operational mode, for selecting one of a first light beam passing through said near range focus lens of said parallel lens assembly and a second light beam passing through said long range focus lens of said lens assembly, said first operational mode allowing said first light beam emerging from said near range focus lens to reach said single photodetector sensor while blocking said second light beam emerging from said long range focus lens, said second operational mode allowing said second light beam emerging from said long range focus lens to reach said single photodetector sensor while blocking said first light beam emerging from said near range focus lens; and optical information reading means for reading said optical information encoded on said object based on said signal indicative of said optical information.

7. An optical information reading apparatus according to claim 6, further comprising:

a manual selector switch which provides a first switching signal and a second switching signal;

said reflected light selecting means switching to said first operational mode in response to said first switching signal, and said reflected light selecting means switching to said second operational mode in response to said second switching signal.

8. An optical information reading apparatus according to claim 6, further comprising:

distance determining means for determining a distance between said lens assembly and said object, and for providing a signal indicative of said distance;

said reflected light selecting means being responsive to said signal provided by said distance determining means so as to switch to said first operational mode when said distance is less than a preselected value and to switch to said second operational mode when said distance is greater than said preselected value.

9. An optical information reading apparatus according to claim 6, wherein said reflected light selecting means includes a liquid crystal filter having a first filter section and a second filter section, said first filter section providing a transmittance of about zero to block said second light beam emerging from said long range focus lens of said lens assembly when said reflected light selecting means is in said first operational mode, and said second filter section providing a transmittance of about zero to block said first light beam emerging from said near range focus lens of said lens assembly when said reflected light selecting means is in said second operational mode.

10. An optical information reading apparatus according to claim 1, wherein said near range focus lens and said long range focus lens are disposed parallel to each other in said lens assembly.

11. An optical information reading apparatus according to claim 8, wherein said distance determining means includes a sonic sensor which outputs sound waves toward said object and receives reflected sound waves from said object, said distance determining means measuring a time said output sound wave takes to travel from said sonic sensor to said object and back to said sonic sensor so as to determine said distance between said lens assembly and said object.

12. An optical information reading apparatus according to claim 1, wherein said single photodetector sensor comprises a CCD image sensor.

13. An optical information reading apparatus according to claim 12, wherein:

respective optical axes of each of said plurality of lenses of said lens assembly extend on a common plane and intersect at said single photodetector sensor; and respective distances between respective centers of each of said plurality of lenses and said single photodetector sensor are substantially equal.

14. An optical information reading apparatus according to claim 13, wherein said CCD image sensor is disposed perpendicular to said common plane on which said respective optical axes of said plurality of lenses extends.

15. An optical information reading apparatus according to claim 13, wherein said reflected light selecting means is provided with a liquid crystal filter including a plurality of sectors disposed between said lens assembly and said CCD image sensor, respective ones of said plurality of sectors being arranged on respective optical axes of said plurality of lenses.

* * * * *